United States Patent [19]

Tatsuta et al.

[11] Patent Number: 5,926,402
[45] Date of Patent: Jul. 20, 1999

[54] SIMULATION METHOD WITH RESPECT TO TRACE OBJECT THAT EVENT OCCURS IN PROPORTION TO PROBABILITY AND COMPUTER PROGRAM PRODUCT FOR CAUSING COMPUTER SYSTEM TO PERFORM THE SIMULATION

[75] Inventors: Shinichi Tatsuta; Yuusuke Sato; Naoki Tamaoki; Hiroshi Komiyama; Yasuyuki Egashira, all of Tokyo, Japan

[73] Assignee: Kabushiki Kaisha Toshiba, Kawasaki, Japan

[21] Appl. No.: 08/811,526

[22] Filed: Mar. 4, 1997

[30] Foreign Application Priority Data

Mar. 5, 1996 [JP] Japan .................................. 8-047529

[51] Int. Cl.$^6$ ........................................................ G06F 9/44
[52] U.S. Cl. ............... 364/578; 204/192.12; 364/468.26; 364/469.02; 364/474.24; 427/489; 428/216
[58] Field of Search ............................. 364/578, 469.02, 364/468, 474.24; 428/216; 427/489, 493; 118/723, 303; 71/64.02; 438/71; 204/192.12; 216/59

[56] References Cited

U.S. PATENT DOCUMENTS

| | | | |
|---|---|---|---|
| 5,282,140 | 1/1994 | Tazaw et al. | 364/468 |
| 5,751,607 | 5/1998 | Ohta | 364/578 |

OTHER PUBLICATIONS

Kersch, et al., Modeling of a Sputter Reactor Using the Direct Simulation Mante Carlo Method, IEEE Conf Proceedings, pp. 7.6.1–7.6.4, Apr. 1992.

Stippel et al., Proess Simulation for the 1990's, Microelectronics Journal, vol. 26, pp. 203–215, 1995.

S. Tatsuta, et al., "Simulation of CVD Step Coverage for $SiH_4$ Using Parellel Processing of DSMC Method", *Proceedings of International Conference on Computational Engineering Science*, vol. 1, (1995) pp. 592–597.

*Primary Examiner*—Kevin J. Teska
*Assistant Examiner*—Lonnie Knox
*Attorney, Agent, or Firm*—Oblon, Spivak, McClelland, Maier & Neustadt, P.C.

[57] ABSTRACT

A simulation method for performing a simulation with respect to a trace object that an event occurs depending on a probability in a domain to be analyzed. The simulation method includes the step of dividing a flowing field into cells serving as domains to be analyzed, the step of arranging molecules serving as the target object in the cells, the step of performing the simulation such that the molecules are moved in the cells and the number of stickings or a sticking amount occurring on a wall surface or a film portion as the result of the movement larger than the number of times of the event or a change amount led by the probability, and the step of outputting, as a simulation result, a film profile obtained as the result of the simulation.

24 Claims, 8 Drawing Sheets

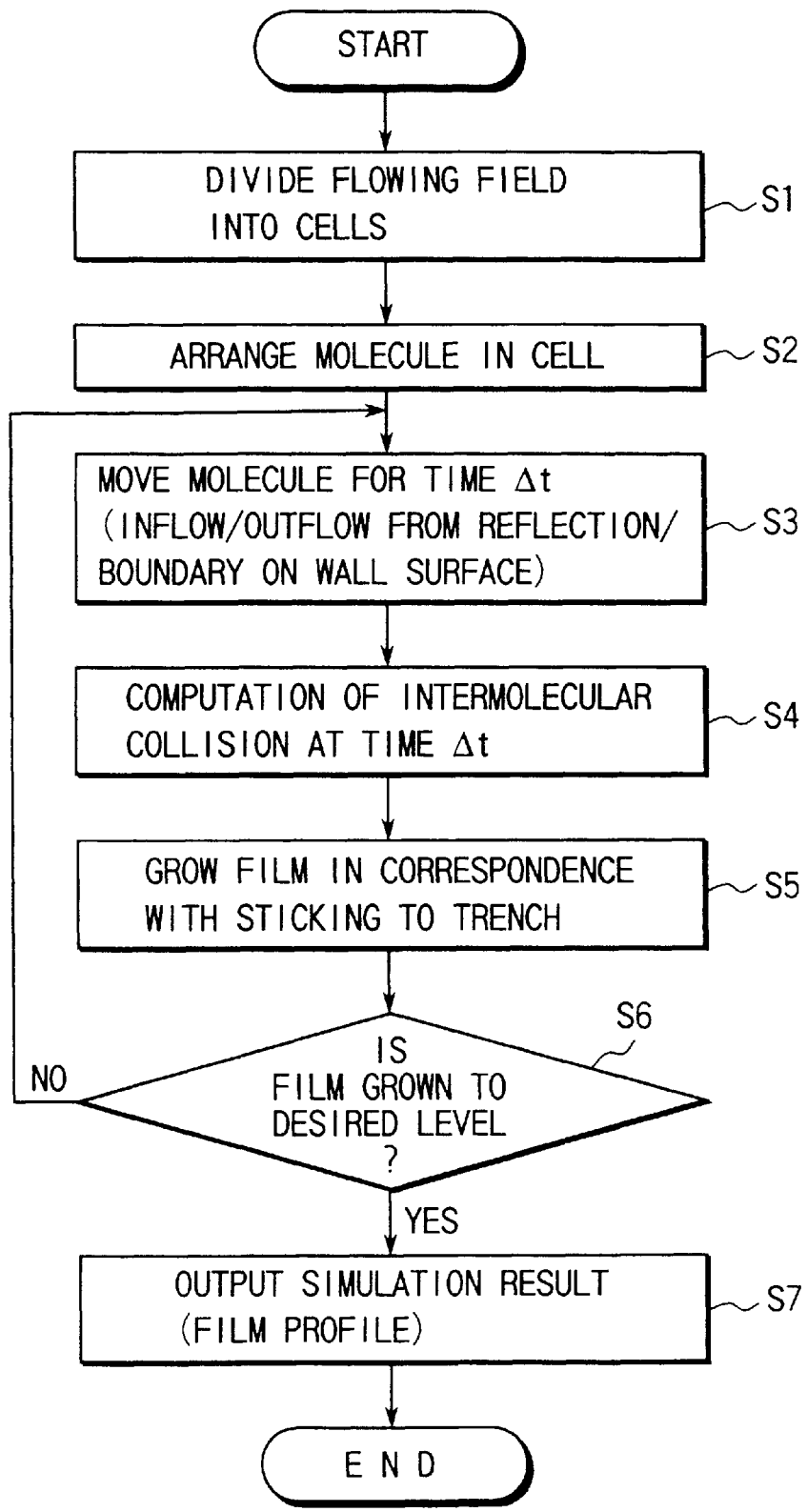
F I G. 4

FIG. 7A

| APPLICABLE APPLICATION FIELD | DOMAIN TO BE ANALYZED |
|---|---|
| BURYING OF THIN FILM | TRENCH ON WAFER SURFACE |
| PRODUCTION OF THIN FILM | ON WAFER SURFACE, ON SEMICONDUCTOR SUBSTRATE |
| ETCHING | ON WAFER SURFACE, ON SEMICONDUCTOR SUBSTRATE |
| LITHOGRAPHY | ON WAFER SURFACE, ON SEMICONDUCTOR SUBSTRATE |
| MIRROR PROCESSING | ON PROCESSING SURFACE |
| PLASMA USE SYSTEM | PLASMA DOMAIN, SHEATH DOMAIN |
| DEPOSITION OF METAL AND NON-METAL | ON DEPOSITION SURFACE |
| SOLIDIFICATION OF LIQUID | OBJECT AND PORTION NEAR OBJECT |
| SYNTHESIZE · SEPARATION OF CHEMICAL MATERIAL | OBJECT AND PORTION NEAR OBJECT |
| RADIATION USE SYSTEM | RADIATION INFLATION RANGE |
| IMAGE PROCESSING | PROCESSING IMAGE |
| DEVICE SIMULATION | SEMICONDUCTOR DEVICE |
| RIVER TECHNOLOGY | RIVER AND PORTION NEAR RIVER |
| SPACE TECHNOLOGY | SATELLITE OR THE LIKE AND PORTION NEAR SATELLITE |
| AUDIO RATING RESEARCH | RESEARCH AREA, RESEARCH RANGE |
| PATH SEARCH | SEARCH RANGE |
| WASHING | ON WAFER SURFACE, ON WASHING SURFACE |
| OPERATION'S RESEARCH | EXAMPLE:STOCK MANAGEMENT |
| FUSION REACTION ANALYSIS | IN REACTION FURNACE |
| ION IMPLANTATION | IN CHAMBER |
| RAY TRACING | INFLATION RANGE OF LIGHT SOURCE |

| APPLICABLE APPLICATION FIELD | TRACE OBJECT |
|---|---|
| BURYING OF THIN FILM | PARTICLES SUCH AS ATOMS, MOLECULES, IONS, ELECTRONS, OR POWDER |
| PRODUCTION OF THIN FILM | PARTICLES SUCH AS ATOMS, MOLECULES, IONS, ELECTRONS, OR POWDER |
| ETCHING | PARTICLES SUCH AS ATOMS, MOLECULES, IONS, OR ELECTRONS |
| LITHOGRAPHY | PARTICLES SUCH AS ATOMS, MOLECULES, IONS, OR ELECTRONS |
| PROCESSING | PARTICLES SUCH AS ATOMS, MOLECULES, IONS, ELECTRONS, OR POWDER |
| PLASMA USE SYSTEM | PARTICLES SUCH AS ATOMS, MOLECULES, IONS, OR ELECTRONS |
| DEPOSITION OF METAL AND NON-METAL | PARTICLES SUCH AS ATOMS, MOLECULES, IONS, ELECTRONS, OR POWDER |
| SOLIDIFICATION OF LIQUID | PARTICLES SUCH AS ATOMS, MOLECULES, IONS, ELECTRONS, OR POWDER |
| SYNTHESIZE ·SEPARATION OF CHEMICAL MATERIAL | PARTICLES SUCH AS ATOMS, MOLECULES, IONS, ELECTRONS, OR POWDER |
| RADIATION USE SYSTEM | ELECTROMAGNETIC WAVE |
| IMAGE PROCESSING | IMAGE PIXEL |
| DEVICE SIMULATION | PARTICLES SUCH AS ELECTRONS OR HOLES |
| RIVER TECHNOLOGY | PARTICLES SUCH AS ROCK OR BALLAST |
| SPACE TECHNOLOGY | PARTICLES SUCH AS SATELLITE OR DUST |
| AUDIO RATING RESEARCH | RESEARCHER OR RESEARCH PATH |
| PATH SEARCH | RESEARCH PATH |
| WASHING | PARTICLES SUCH AS ATOMS, MOLECULES, IONS, ELECTRONS, OR POWDER |
| OPERATION'S RESEARCH | STOCK ITEMS |
| FUSION REACTION ANALYSIS | PARTICLES SUCH AS ATOMS, MOLECULES, IONS, OR ELECTRONS |
| ION IMPLANTATION | PARTICLES SUCH AS ATOMS, MOLECULES, IONS, OR ELECTRONS |
| RAY TRACING | LIGHT QUANTUM |

FIG. 7B

| APPLICABLE APPLICATION FIELD | EVENT |
|---|---|
| BURYING OF THIN FILM | STICKING |
| PRODUCTION OF THIN FILM | STICKING |
| ETCHING | ETCHING |
| LITHOGRAPHY | CHEMICAL CORROSION |
| PROCESSING | GRINDING |
| PLASMA USE SYSTEM | REACTION BY INTERPARTICLE COLLISION |
| DEPOSITION OF METAL AND NON-METAL | STICKING |
| SOLIDIFICATION OF LIQUID | REACTION BY INTERPARTICLE COLLISION |
| SYNTHESIZE · SEPARATION OF CHEMICAL MATERIAL | REACTION BY INTERPARTICLE COLLISION |
| RADIATION USE SYSTEM | ABSORPTION · REACTION · PERMEATION |
| IMAGE PROCESSING | PROCESSING MODEL |
| DEVICE SIMULATION | BREAKDOWN OR THE LIKE |
| RIVER TECHNOLOGY | INTERPARTICLE COLLISION, COLLISION WITH QUAY WALL |
| SPACE TECHNOLOGY | INTERPARTICLE COLLISION |
| AUDIO RATING RESEARCH | DATA ACQUISITION |
| PATH SEARCH | DATA ACQUISITION |
| WASHING | PEELING OF FOREIGN MATTER |
| OPERATION'S RESEARCH | CIRCULATION |
| FUSION REACTION ANALYSIS | REACTION BY INTERPARTICLE |
| ION IMPLANTATION | REACTION BY COLLISION WITH WALL SURFACE |
| RAY TRACING | REACTION · ABSORPTION BY COLLISION WITH WALL SURFACE |

F I G. 7C

| APPLICABLE APPLICATION FIELD | PROBABILITY |
|---|---|
| BURYING OF THIN FILM | STICKING PROBABILITY |
| PRODUCTION OF THIN FILM | STICKING PROBABILITY |
| ETCHING | SPUTTERING PROBABILITY |
| LITHOGRAPHY | ETCHING PROBABILITY |
| PROCESSING | SPUTTERING PROBABILITY |
| PLASMA USE SYSTEM | REACTION PROBABILITY |
| DEPOSITION OF METAL AND NON-METAL | STICKING PROBABILITY |
| SOLIDIFICATION OF LIQUID | REACTION PROBABILITY |
| SYNTHESIZE · SEPARATION OF CHEMICAL MATERIAL | REACTION PROBABILITY |
| RADIATION USE SYSTEM | ABSORPTION FACTOR, REFLECTANCE, PERMEABILITY |
| IMAGE PROCESSING | PROCESSING PROBABILITY |
| DEVICE SIMULATION | BREAKDOWN PROBABILITY |
| RIVER TECHNOLOGY | BREAKDOWN PROBABILITY, ACCUMULATION PROBABILITY |
| SPACE TECHNOLOGY | PHENOMENON PROBABILITY |
| AUDIO RATING RESEARCH | ACQUISITION PROBABILITY |
| PATH SEARCH | ACQUISITION PROBABILITY |
| WASHING | PEELING PROBABILITY |
| OPERATION'S RESEARCH | DEMAND-SUPPLY PROBABILITY |
| FUSION REACTION ANALYSIS | REACTION PROBABILITY |
| ION IMPLANTATION | REACTION PROBABILITY |
| RAY TRACING | ABSORPTION FACTOR, REFLECTANCE, PERMEABILITY |

| APPLICABLE APPLICATION FIELD | NUMBER OF CHANGES · AMOUNT |
|---|---|
| BURYING OF THIN FILM | NUMBER OF STICKINGS |
| PRODUCTION OF THIN FILM | NUMBER OF STICKINGS |
| ETCHING | NUMBER OF SPUTTERING |
| LITHOGRAPHY | CORROSION AMOUNT |
| PROCESSING | NUMBER OF SPUTTERING |
| PLASMA USE SYSTEM | REACTION AMOUNT |
| DEPOSITION OF METAL AND NON-METAL | NUMBER OF STICKINGS |
| SOLIDIFICATION OF LIQUID | NUMBER OF REACTIONS |
| SYNTHESIZE · SEPARATION OF CHEMICAL MATERIAL | NUMBER OF REACTIONS |
| RADIATION USE SYSTEM | ABSORPTION AMOUNT |
| IMAGE PROCESSING | PROCESSING AMOUNT |
| DEVICE SIMULATION | BREAKDOWN AMOUNT OR THE LIKE |
| RIVER TECHNOLOGY | NUMBER OF TIMES |
| SPACE TECHNOLOGY | NUMBER OF PHENOMENA; AMOUNT |
| AUDIO RATING RESEARCH | NUMBER OF ACQUISITIONS, AMOUNT |
| PATH SEARCH | NUMBER OF ACQUISITIONS, AMOUNT |
| WASHING | NUMBER OF PEELINGS |
| OPERATION'S RESEARCH | DEMAND-SUPPLY AMOUNT |
| FUSION REACTION ANALYSIS | NUMBER OF REACTIONS |
| ION IMPLANTATION | NUMBER OF REACTIONS |
| RAY TRACING | ABSORPTION AMOUNT |

SIMULATION METHOD WITH RESPECT TO TRACE OBJECT THAT EVENT OCCURS IN PROPORTION TO PROBABILITY AND COMPUTER PROGRAM PRODUCT FOR CAUSING COMPUTER SYSTEM TO PERFORM THE SIMULATION

BACKGROUND OF THE INVENTION

The present invention relates to a simulation method for an object associated with a problem occurring in reality is probabilistic and, more particularly, to a change prediction method or a film profile prediction method to which the simulation method is applied.

As well known, in manufacturing a semiconductor device, the step of producing a thin film on a substrate is present. As a method of producing the thin film, a Chemical Vapor Deposition (CVD) method is frequently employed In recent years, with improvement on the technique, the thickness of a circuit pattern on the substrate must be 1 $\mu$m or less, and a thin film produced on the pattern must be also micropatterned according to the decrease in thickness. When the integration density of the device is increased, a burying characteristic (step coverage) in a pattern with a step difference (trench) can become a problem.

For example, by using a reduced-pressure CVD method, and by using silane ($SiH_4$) and argon (Ar) gas as a source gas and a carrier gas, a polycrystalline silicon film is formed on the inner surface of a trench formed in a wafer and having an aspect ratio of about 10 under the conditions: a wafer temperature of 700° C., a pressure of 25 Torr; an Ar flow rate of 4.5 l/min; and an $SiH_4$ flow rate of 1.0 l/min. The film thickness is almost constant at a deep position in the trench, but an overhang is observed at the upper position of the trench. For this reason, the presence of film formation species having a low sticking probability and the presence of film formation species having a high sticking probability are suggested. More specifically, it is considered that at least two types of film formation species contribute to film formation.

It is considered that the $SiH_4$ gas reacts as expressed by equation (1) and influences film formation.

$$SiH_4 \leftrightarrows SiH_2 + H_2 \qquad (1)$$

Since silylene ($SiH_2$) generated by the reaction expressed by equation (1) is considered to have high reactivity and a sticking probability of about 1, it is assumed that the film formation species having a high sticking probability is $SiH_2$. In this case, the sticking probability and density ratio of film formation species near the trench is regarded as a parameter for determining a film formation profile. For example, since the sticking probability of $SiH_2$ is almost 1, such molecules having a high sticking probability form a film at the entrance portion of the trench. For this reason, the molecules cannot deeply enter the trench. Even a small amount of such reaction at an intermediate depth degrades the step coverage.

The method of performing the experiment with changing conditions as described above to determine a film formation thickness or a film formation profile has a lack of applicability, and optimum conditions which are satisfactory cannot be easily found. For this reason, a prediction method for correctly predicting the film formation thickness and film formation profile within a short period of time must be developed.

For papers which disclose the prediction method, Tatsuta et al: Simulation of CVD Step Coverage for $SiH_4$ using Parallel Processing of DEMC Method, Computational Mechanics '95 (Processings of International Conference on Computational Engineering Science) Vol. 1, pp. 592 to 597, Springer-Verlag (1995), Toshiki Iino: Simulation for Semiconductor Film Formation Profile, Japan Society of Mechanical Engineers, 68th General Meeting Lecture Data, Vol. D (1994), pp. 447 to 449, or the like is known.

In the prediction method described in the above papers, a combination of an analysis of diluted gas flow and the simulation for film growing depending on the diluted gas flow is used. The Direct Simulation Monte Carlo (DSMC) method may be used for the analysis of diluted gas flow, and a string model, a cell model, or the like may be used for the simulation for film formation.

As a practical procedure for predicting film formation, a series of simulations in which the analysis of diluted gas flow in a computational domain, and a film is grown depending on the volume of sticking molecules are repeated until sticking of a required number of molecules is completed.

However, since such a conventional simulation method requires time integration for the analysis of diluted gas flow, when burying of a thin film into the trench described above is predicted, even if a computer having a relatively high speed is used, one month or one year or longer is required to perform one prediction treating film formation species having an especially low sticking probability. When a vector computation or a parallel process is employed, the required time can be shortened to some extent. However, when film formation species having a very low sticking probability is used, a long period of time is still required. For this reason, in the conventional method, the time required for prediction cannot be performed without considerably degrading prediction precision or considerably decreasing a prediction range.

More specifically, in the conventional simulation method of a problem that occurring in reality is probabilistic, a extremely long period of time is required to perform one prediction depending on the conditions. In addition, when the period of time is to be shortened, prediction precision is degraded, or an analysis range is limited to a specific range.

BRIEF SUMMARY OF THE INVENTION

It is an object of the present invention to provide a simulation method in which a calculation time can be made almost constant, independent of probability when simulating an object that a problem occurring in reality is probabilistic.

In order to achieve the above object, according to the present invention, there is a simulation method for performing a simulation for a trace object that an event occurs depending on a probability within an analysis target domain, comprising:

the first step of arranging the trace object in the analysis target domain;

the second step of performing a simulation such that the trace object is moved and the number of times of the event occurring as the movement of the trace object or a change amount is made larger than the number of times of the event or a change amount led by the probability; and the third step of outputting a simulation result.

More specifically, the second step includes the step of, even if the computation is performed on the basis of the known probability of sticking such that the trace object is reflected from a wall surface without sticking on the wall surface, performing the computation such that the trace object is reflected from and stuck on the wall surface to make the number of stickings larger than the number of stickings calculated by the known sticking probability.

The second step preferably includes the step of, when two or more types of trace objects are used, causing the trace objects to occur in computation depending on the product of the density ratio of the trace objects and a sticking probability.

Furthermore, the second step preferably includes the step of, when two or more types of trace objects are used, causing the trace objects to collide with each other in computation depending on the product of the density ratio of the trace objects and a sticking probability.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a flow chart showing a processing procedure performed by the prediction method according to the present invention;

FIGS. 7A to 7E are tables showing application fields to which the simulation method according to the present invention can be applied.

DETAILED DESCRIPTION OF THE INVENTION

The characteristic feature of the present invention will be described below before an embodiment of the present invention is described.

Particles such as atoms or molecules are caused to collide with or are stuck on the particles constituting a semiconductor substrate, glass, a gas, or liquids so that a process of performing production or etching of an amorphous material, a crystal, a polycrystal, a thin film, or the like is performed. In this case, predictions of the thickness, chemical characteristics, physical characteristics, and other material values of a thin film or the like to be finally produced or etched performed by a numerical simulation will be described as an example.

In these predictions, a numerical analysis method such as an analysis of a continuous fluid flow or a diluted gas flow and a simulation for a change in profile such as film growing are independently or simultaneously performed.

In the simulation for a change in profile, modeling of a profile is expressed by a string model which regards a surface as continuous lines, a cell model which regards the profile as a polygon, a polyhedron, or something constituted thereby, or a network model which regards the profile as a network constituted by connecting a large number of points to each other. The simulation is performed by changing a profile depending on a volume or an area measured during sticking.

Since the simulation is equivalent to a process in which a so-called flow analysis is performed and then time integration is performed, the simulation requires an extremely long calculation time. A prediction of burying a thin film in a trench in the steps in manufacturing a semiconductor device given as an example, as described above, requires one month to one year or more of calculation time.

An analysis method according to the present invention will be described below with reference to a prediction of burying a thin film in a trench in the steps of manufacturing a semiconductor device.

In order to make the difference between the conventional analysis method and the analysis method according to the present invention clear, the analysis method according to the present invention is called a Stick-at-All-the-Reflection-Points method (SARP) method hereinafter. The SARP method is also effective as a parallel process in a parallel computer, and can simultaneously perform an analysis for each particle or each computational domain.

In the SARP method, a modeling in computation, the following process is performed.

Figure 1:
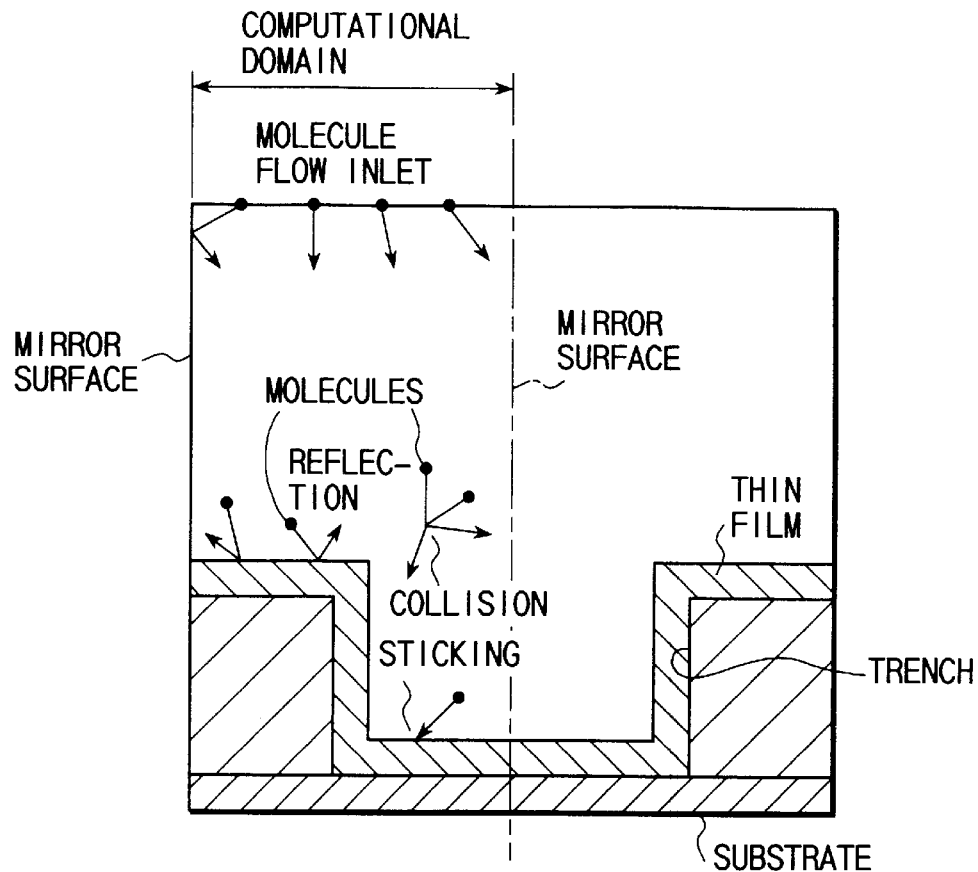
FIG. 1 is a view for explaining a model used in a prediction method according to the present invention.

More specifically, burying of a thin film by a CVD method is given as an example. In this case, an analysis method of a diluted gas using a DSMC method is used for a flow analysis, and the modified Nanbu method is used for intermolecular collisions. As shown in FIG. 1, the left half of a trench is used as a computational domain, the boundary between the right and left halves is treated as a mirror reflection. A reactive gas such as silane, silylene, or disilane flows into the upper boundary, and any reaction between film formation species caused by intermolecular collisions in the computational domain does not occur.

Molecules colliding with the trench are stuck (probability $\eta$) or are reflected (probability $1-\eta$) depending on a reaction probability such as a sticking probability ($\eta$). When the molecules are stuck, the profile of the trench surface is changed by a simulation for a change in profile. Such an object can also be called an object that an event occurs depending on a probability or an object that a state or quality is changed by receiving an action of a factor depending on a probability.

Here, the SARP method is based on the following new way of thinking.

Figures 2, 3:
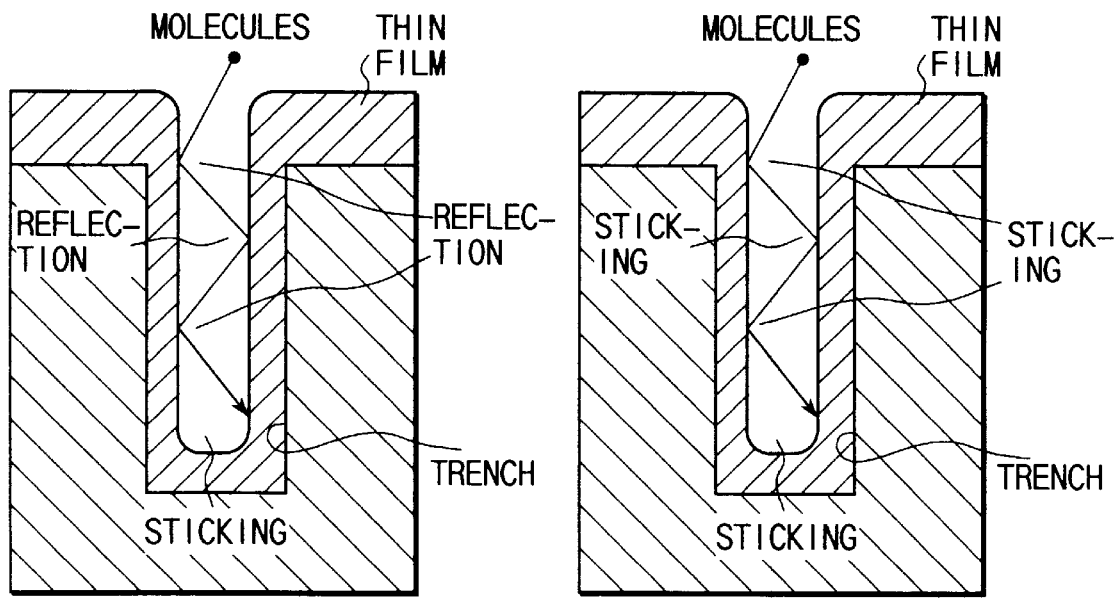
FIG. 2 is a view for explaining a basic way of thinking used in a conventional prediction method.
FIG. 3 is a view for explaining a basic way of thinking used in the prediction method according to the present invention.

More specifically, stickings of molecules on a film surface by the CVD method are treated in a simulation which has been performed, stickings occur when a random number is smaller than the sticking probability $\eta$, and reflections occur when the random number is larger than the sticking probability $\eta$. This manner is shown in FIG. 2. Probabilistically, molecules are stuck after reflections occur $1/\eta$ times. For example, if it is assumed that $\eta$ is $10^{-5}$, sticking occurs only once after reflections occur $10^5$ times.

In contrast to this, in the SARP method, all reflections of molecules on a sticking surface are treated as reflections and stickings. That is, as shown in FIG. 3, a simulation using the same method as that of the conventional method is used for movement of molecules, and only a method of sticking of molecules is changed. More specifically, in computation, it is regarded that a larger number of molecules than that of the conventional method are stuck. When this method is used, the expected value of sticking molecules is $1/\eta$ times that of the conventional method, and, simply, the calculation time is shortened in proportion to the expected value.

It will be described below that the conventional method and the SARP method leads to the same calculation result of a distribution of the number of sticking molecules. The problem expressed in Table 1 will be used as an example.

TABLE 1

Examples of Gas Mixture

|  | A | B | C |
|---|---|---|---|
| Assumed Gas | Ar(carrier gas) | $SiH_4$ | $SiH_2$ |
| Concentration Ratio | 0.5 | 0.5 | $10^{-6}$ |
| Sticking Probability | 0 | $10^{-6}$ | 1 |

[1] Number of Stickings

The difference between the numbers of sticking molecules will be described first.

It is assumed that molecules are incident into a trench as shown in FIGS. 2 and 3, and that the molecules do not flow from out of the computational domain. For to a certain film formation species, the following values are given, sticking probability: $\eta$ the number of incident molecules: N in the i-th reflection on the sticking surface, the number of sticking molecules: $n_i$ sticking probability: $p_i$ In this case, according to the conventional method, the values can be set as follows:

$$n_1 = N\eta$$

$$n_2 = N\eta(1-\eta)$$

$$n_3 = N\eta(1-\eta)^2$$

$$n_i = N\eta(1-\eta)^{i-1} \qquad (2)$$

$$p_i = ni/N\eta(1-\eta)^{i-1} \qquad (3)$$

More specifically, a probability of stickings occurring in the i-th reflection can be expressed by equation (3). When the orbits of molecules do not change, and equation (3) can also be established in the SARP method, the same film formation profiles must be realized in the conventional method and the SARP method.

Superscript * is added in the SARP method hereinafter. Molecules which are not stuck until the (I+1)th reflection occurs in the conventional method are treated as sticking molecules in the SARP method, the following equations are established:

$$n_i^* = \sum_{j=i}^{\infty} n_j \qquad (4)$$

$$= \sum_{j=1}^{\infty} n_j - \sum_{j=1}^{i-1} n_j$$

$$= N - \sum_{j=1}^{i-1} N\eta(1-\eta)^{j-1}$$

$$= N - N\eta \frac{1-(1-\eta)^{i-1}}{1-(1-\eta)}$$

$$= N(1-\eta)^{i-1}$$

$$p_i^* = n_i^*/N^* \qquad (5)$$

$$= \frac{n_i^*}{\sum_{i=1}^{\infty} n_i^*}$$

$$= \eta(1-\eta)^{i-1}$$

When the conventional method and the SARP method are compared with each other, as is apparent from equations (2) and (4), the same results are obtained in the conventional method and the SARP method except that the number of stickings in the SARP method is $1/\eta$ times that in the conventional method. It is apparent that the same stickings of molecules as in the conventional method can be obtained in the SARP method. More specifically, when one type of film formation species is used, the same results can be obtained with respect to the distribution of the numbers of stickings in the conventional method and the SARP method.

[2] Number of Generated Molecules (number of inflows)

As described above, the number of stickings in the SARP method is larger than the number of stickings in the conventional method by $1/\eta$. This poses problem when two types of film formation species are used.

In the example in Table 1, the number of stickings of molecules B in the SARP method is $10^6$ times that in the conventional method, and the number of stickings of molecules C in the SARP method is equal to that in the conventional method. For this reason, an erroneous result is obtained without correcting the number of stickings.

As a method of solving this problem, it may be considered that the numbers of stickings of the film formation species are $\eta$ times. However, the number of calculations increases, and the high-speed merit obtained in the SARP method cannot be obtained. For this reason, the method cannot be employed. Therefore, the number of generated molecules is corrected in the SARP method.

Conventional generation of molecules is performed in proportion to a density ratio (pressure ratio) of gases to be treated. For example, in conventional generation, $10^6$ molecules A and $10^6$ molecules B are generated while one molecule C is generated. A distribution is performed by generating a random number.

However, in the SARP method, a disadvantage occurs when the same method as described above is used. For this reason, by using the following ratio without using a simple concentration ratio $P_k$:

$$P_k \times \eta_k$$

of molecules are generated. In this expression, $P_k$ is a concentration ratio of film formation species k, and $\eta_k$ is a sticking probability. Therefore, the ratio of the numbers of generated film formation species is as follows:

$$r_k = \frac{P_k \times \eta_k}{\sum_s P_s \times \eta_s} \quad (6)$$

However, there is a carrier gas (inert gas), the ratio cannot be determined because the sticking probability of the carrier gas is 0. In this case, although an arbitrary number can be set as the ratio, it is preferable in consideration of calculation precision that the ratio is not extremely different from the number of generated gas molecules, the ratio is conveniently set to be ½ the total number of generated molecules.

Therefore, equation (6) can also be expressed as follows:

$$r_k = \frac{P_k \times \eta_k}{2\sum_s P_s \times \eta_s} \quad (7)$$

For example, in the example shown in Table 1, A:B:C= ½:¼:¼. Therefore, since $n_j$ in equation (4) is $n_j^*\eta_k$, a state wherein the number of sticking molecules is 1/η) times that of the conventional method can be canceled. The same number of stickings (equation (4)) and the same probability (equation (5)) can be obtained in the SARP method and the conventional method.

[3] Intermolecular Collision

Movement of molecules will be described below. The orbit of the molecules obtained by removing intermolecular collision from molecular movement in the conventional method is the same as that in the SARP method. This is easily supposed because the SARP method is not directly related to the molecular movement However, since generation of molecules is performed according to equation (7), the ratio of the number of molecules in the computation is different from that in reality. For this reason, an operation must be added to the intermolecular collision to modify the intermolecular collision.

One intermolecular collision is represented by i, the other is represented by j, and a collision probability of i:j per unit time is represented by $G_{ij}$. In this case, the probability of collision between i and any other molecule per unit time is $$G_i = \sum_{j=1}^{N} G_{ij} \quad (8)$$

However, the molecules j serving as molecules with which the molecule i collides are generated by a method different from that in reality, and the number of molecules j is different from the number in reality Thus $G_{ij}$ must be described as below with superscript * in computation.

$$G_{ij}^* = \frac{R_{k(j)}}{r_{k(j)}} G_{ij} \quad (9)$$

where k(j) is a film formation species to which the molecule j belongs, $R_{k(j)}$ is a concentration ratio in reality, $r_{k(j)}$ is a concentration ratio (ratio of the numbers of generated molecules) in computation based on equations (6) and (7). The following conditions are satisfied:

$$\sum_k R_k = 1 \quad (10)$$

$$\sum_k r_k = 1 \quad (11)$$

Therefore, the probability of intermolecular collision in the SARP method can be calculated by equations (8) and (9) as follows:

$$G_i^* = \sum_{j=i}^{N} \frac{R_{k(j)}}{r_{k(j)}} G_{ij} \quad (12)$$

Note that a molecular speed after collision occurs according to equation (12) is treated according to the conventional method.

[4] Acceleration Ratio

Finally, the acceleration ratio achieved by the SARP method is considered. A ratio of the number of sticking molecules per unit area with the conventional method to that with the SARP method (the multiple of the number of sticking molecules) is used. On the contrary, since the acceleration ratio is in direct proportional to the number of steps (ratio of proceeding times in computation) of repetitive computation until a predetermined number of molecules are stuck, attention must be given when film formation profiles in the same step are compared with each other while calculation conditions are changed, or when a proceeding time of film formation is considered as a problem. In addition, since the number of calculation steps is in proportion to the calculation time, the acceleration ratio described here is also regarded as a ratio of a time required for an actual calculation to that in the conventional method.

Assuming no outflow of molecules from the computational domain, when there is a carrier gas, in the conventional method, as described above, the number of generated molecules is in proportion to $$R_K = P_k \quad (13)$$

and stickings occur at a ratio having a magnification equal to that of the number of generated molecules.

$$Q_K = P_K \times \eta_k \quad (14)$$

where k is film formation species.

In contrast to this, in the SARP method, as expressed in equations (6) and (7), molecules are generated by a product ($r_k$) of a concentration ratio and a sticking probability. Since stickings occur at a rate obtained by multiplying $r_k \cdot \eta_k$ by 1/$\eta_k$, when equation (7) in which a carrier gas is expressed by ½ is used, the ratio of occurrence of stickings is given by the following equation:

$$Q_k = \frac{P_k \times \eta_k}{2\sum_s P_s \times \eta_s} \quad (15)$$

More specifically, as a conclusion, the ratio of equations (14) and (16) represents an acceleration ratio, and the following equation is obtained:

$$\alpha = \frac{1}{2\sum_s P_s \times \eta_s} \quad (16)$$

For example, under the conditions shown in Table 1, the acceleration ratio is about 330,000.

It is characteristic that all film formation species of the gas mixture have the same value. For this reason, even if a gas mixture having any composition is used, an acceleration ratio changes depending on the film formation species. More specifically, use of the SARP method does not lead an erroneous result.

The above is the way of thinking of the SARP method which is the basic idea of the present invention. As a conclusion, the treatment of molecules in the SARP method is different from that in the conventional method with respect to the three points: (1) sticking on a film formation surface; (2) number of generated molecules; and (3) intermolecular collision.

An embodiment of the present invention, i.e., an analysis method of the present invention will be described below with reference to FIG. 4 using as an example the prediction of burying a thin film into a trench by the CVD method in the steps in manufacturing a semiconductor device.

The model shown in FIG. 1 is assumed, a flowing field is divided into a plurality of cells (domains to be analyzed) (step S1). Each cell may include a film portion which has been formed on the wall surface of the trench.

Molecules are generated, and the molecules are arranged on each cell (step S2). A flow analysis of molecules when the molecules in the cell are moved for a time $\Delta$ by using the DSMC method is performed (step S3). When the cell includes the wall surface of the trench or the film portion, some molecules collide the wall surface or the film portion. In this case, the number of molecules reflected according to equation (2) is calculated as the number of molecules which is stuck simultaneously with the reflections. Some molecules flow into the cell from the outside of the cell, and some molecules flow out of the cell. When there are two or more types of molecules in the cell, the molecules are generated by calculation using the ratio shown in equation (6) or (7). More specifically, the ratio of molecules is corrected to a value obtained by multiplying the actual concentration ratio (pressure ratio) of the molecules by the sticking probability of the molecules.

Calculation of intermolecular collision (modified Nanbu method) is performed (step S4). In this case, when there are two types of molecules in a cell, the intermolecular collision probability of the molecules is corrected according to equation (12).

A film is grown such that a simulation for film growth depending on stickings of molecules on the trench as expressed in equation (4) is carried out. The processes in step S3 to step S5 are repeated until the film is grown to reach a desired level. The calculation is finished when the film reaches the desired level (step S6), and a film profile is output as a simulation result (step S7).

Although the flowing field is divided into a plurality of cells in this simulation, the entire flowing field may be considered as one domain to be analyzed. In addition, although molecules have been arranged in the cells in this simulation, this arrangement need not be used. However, this arrangement can shorten a calculation time.

In order to effectively perform parallel calculation by a parallel computer in the above computation, an amount of calculation between processors must be decreased, and the calculation loads on the processors must be dynamically averaged (dynamic load distribution) according to the loads. However, when molecules are partitioned to variably distribute molecular information to the processors, the information of the molecules in the same cell is distributed to several processors. For this reason, information exchange must be performed by cumbersome inter-processor communication in collision pair extraction.

A method (domain dividing method) in which a computational domain is divided by the number of processors, and divided domains are allocated to the processors in a one-to-one correspondence is generally used. However, as the object described here, when a wall surface moves, and an analysis domain changes with proceeding of calculation, a method of the dynamic load distribution may be easily cumbersome. Therefore, when such an object is used, a cell dividing method which can cope with the cumbersome change in analysis domain is preferably employed.

The cell dividing method which uses that calculation for intermolecular collision is independently performed in each cell. In this method, the entire domain is divided into cells, and the divided domains are sequentially allocated to the processors, so as to make the molecules parallel. Data exchange is performed only between one parent processor and other child processors. A method in which the parent processor manages data, and the child processors perform calculation is employed. The same program runs in all the child processors, and reception, calculation, and transmission are simply repeated. The parent processor repeats the operation in which data in units of cells from the start cell are sequentially given to a child processor which does not execute calculation or has completed calculation, and a calculation result serving as an answer is received. Reception of the calculation results from all the cells means completion of one step. The same operation started from the start cell is performed again. Since the loads on the child processors are automatically averaged without making an operator be conscious of it, molecules are partitioned by the same manner as described above regardless of the number of child processors. For this reason, programming and execution of the program can be easily performed. Even if the number of moving molecules has anisotropy, or the processors have variations in performance, no problem is posed. When it is set that calculation for only one cell is performed in each child processor at once, a storage capacity can be suppressed to a capacity of one cell, and calculation having a scale larger than that in the domain dividing method can be performed.

A thin film burying prediction result which is actually obtained by using the SARP method will be described below.

Conditions for CVD used in the simulation are shown in Table 2.

TABLE 2

| | Computation Conditions | | |
|---|---|---|---|
| | Sticking Probability | Pressure (Torr) | Film Formation Contribution Rate |
| Ar | 0 | 24.2 | 0 |
| SiH$_4$ | $10^{-1}$ | 0.8 | $0.8 \times 10^{-1}$ |
| SiH$_2$ | 1 | $0.8 \times 10^{-1}$ | $0.8 \times 10^{-1}$ |

The conditions in Table 2 are different from those in Table 1 for the following reason. That is, an actual simulation cannot be performed, because of the long calculation time in the conventional method. Since a sticking probability is high under the conditions in Table 2, the simulation can be performed even in the conventional method, and the results in the conventional method can be compared with those in the SARP method. The film formation contribution rates are set to be equal to each other for $SiH_4$ and $SiH_2$. The film formation contribution rate is defined for each film formation species by the following equation:

$$S_k = \eta_k \cdot P_k \quad (17)$$

This film formation distribution rate is an index representing the contribution to film formation of the film formation species. The degrees of contribution to film formation of the respective film formation species can be relatively compared with each other.

Figure 5B:
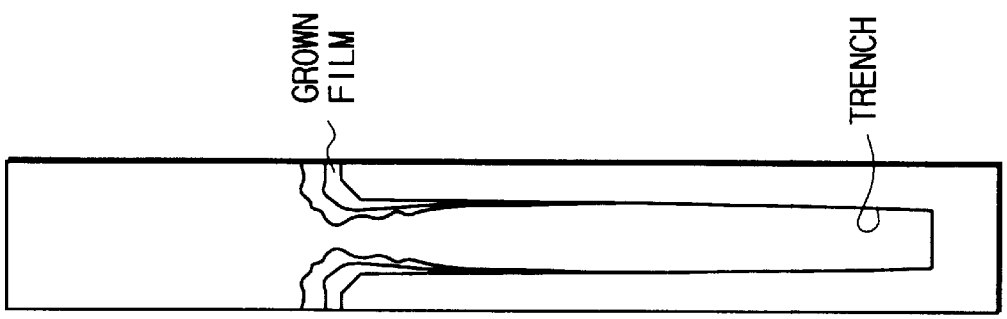
FIG. 5B is a view showing a result (film formation profile) obtained by performing an analysis by the method according to the present invention.
Figure 5A:
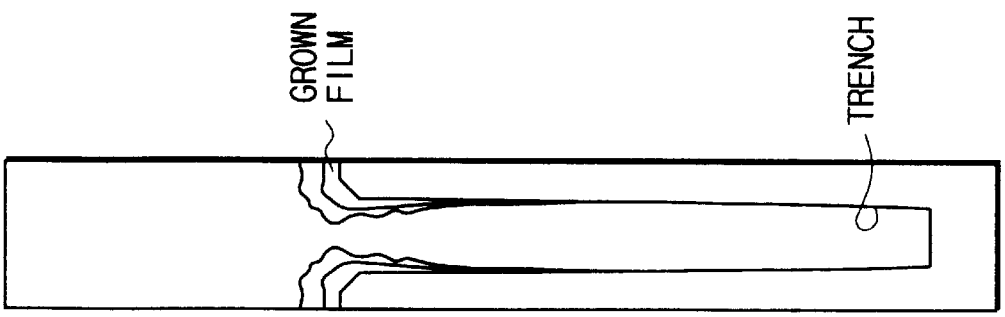
FIG. 5A is a view showing a result (film formation profile) obtained by performing an analysis by a conventional method.

FIG. 5A shows an analysis result (film formation profile) obtained by the conventional method on the basis of the conditions in Table 2, and FIG. 5B shows an analysis result (film formation profile) obtained by the SARP method on the basis of the conditions in Table 2. As is apparent from both the drawings, the conventional method and the SARP method exhibit almost the same results, and it is understood that the result does not change in the SARP method. An acceleration rate under the conditions is about 78 according to equation (16).

Table 3 shows comparison of calculation times obtained by actually measuring times required until approximately 1,000 typical particles are stuck on the trench, and Table 4 shows comparison of the numbers of repetitive calculations.

for the following reason. Computation for a predetermined time regardless of a sticking probability is present (since the result in the SARP method is slightly larger than the calculation time in the conventional method/acceleration rate in the SARP method), and the number of molecules in the system when the sticking probability is high is smaller than that when the sticking probability is low (the number of molecules which are eliminated by sticking is large when the sticking probability is high). The result in the conventional method does not coincide with the result in the SARP method when the sticking probability is 1 because generation of molecules is determined by the product of the concentration ratio and the sticking probability (i.e., the generation rate of sticking molecules in the SARP method is higher than that in the conventional method).

Figure 6:
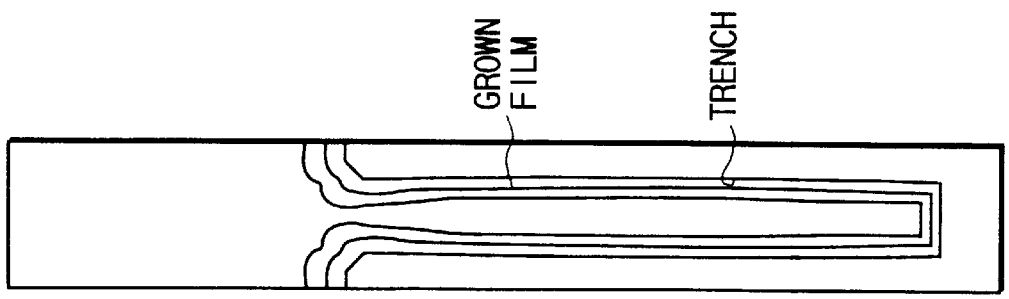
FIG. 6 is a view showing an output result (film formation profile) obtained by performing a simulation by the method according to the present invention.

FIG. 6 shows a simulation result which is close to an actual result.

TABLE 5

| | Computation Conditions | | |
|---|---|---|---|
| | Sticking Probability | Pressure (Torr) | Film Formation Contribution Rate |
| Ar | 0 | 24.2 | 0 |
| $SiH_4$ | $10^{-5}$ | 0.8 | $0.8 \times 10^{-5}$ |
| $SiH_2$ | 1 | $0.8 \times 10^{-5}$ | $0.8 \times 10^{-5}$ |

Table 5 shows a result obtained by applying the SARP method to the CVD conditions. An acceleration rate is

TABLE 3

Comparison of Calculation Time

| Sticking Probability | $10^0$ | $10^{-1}$ | $10^{-2}$ | $10^{-3}$ | $10^{-4}$ | $10^{-5}$ | $10^{-6}$ |
|---|---|---|---|---|---|---|---|
| Conventional Method | 6973 | 22250 | 93550 | 789610 | 933300 | | |
| SARP Method | 365 | 130 | 68 | 58 | 59 | 61 | 61 |
| Calculation Time of Conventional Method/ Acceleration Rate of SARP Method | 446 | 142 | 60 | 51 | 60 | | |

TABLE 4

Comparison of Number of Repetive Computations

| Sticking Probability | $10^0$ | $10^{-1}$ | $10^{-2}$ | $10^{-3}$ | $10^{-4}$ | $10^{-5}$ | $10^{-6}$ |
|---|---|---|---|---|---|---|---|
| Conventional Method | 16130 | 50370 | 206500 | 1721730 | 20361300 | | |
| SARP Method | 1003 | 331 | 166 | 144 | 147 | 151 | 151 |
| Calculation Time of Conventional Method/ Acceleration Rate of SARP Method | 1032 | 322 | 132 | 110 | 130 | | |

In this case, in order to simplify the problem, only Ar and $SiH_4$ in Table 2 are treated, and the sticking probability of $SiH_4$ is set to be variable. In Tables 3 and 4, (calculation time in the conventional method/acceleration rate in the SARP method) is a result calculated by dividing the calculation time or the number of calculations by the acceleration rate obtained by the SARP method expressed by equation (16). The result is obtained by predicting a case wherein acceleration is ideally performed according to the conventional method. The above result almost coincides with (calculation time in the conventional method/acceleration in the SARP). The properness of above theory, especially, equation (17) is proved. The conventional method is not in proportion to $1/\eta$ 781,250 according to equation (16). Under, the conditions in Table 5, one year to ten years or longer predicted for the simulation in the conventional method. It is understood that almost correct simulation is performed as a whole.

In the above description, the present invention is applied to thin film production prediction by the CVD. When proper correction is performed for each field, the present invention can be applied to various fields.

More specifically, the basic idea being inherent in the claimed invention can be applied to numerical simulation for various objects that problems occurring in reality is probabilistic.

For example, as application fields, as shown in FIG. 7A, fields such as burying of a thin film, thin film generation, etching, lithography, mirror processing, a plasma-use system, deposition of a metal material or a non-metal material, solidification of liquid, synthesization/separation of a chemical material, a radiation-use system, image processing, device simulation, river technology, space technology, audience rating research, path research, washing, operation's research, fusion reaction analysis, ion implantation, ray tracing, and the like can be used.

FIGS. 7A to 7E show domains to be analyzed in which the simulation of the invention in each application field, trace objects, events occurring with respect to the trace objects, probabilities of occurring of the events, and change amounts of the events. As products obtained as results, an amorphous material, a crystal, a thin film, a polycrystal, a solid, and the like are available. As a carrier gas which can be used at this time, argon atoms, hydrogen gas molecules, oxygen molecules, and the like are available. In addition, as a reactive gas which can be used at this time, silane, silylene, disilane, or the like is available.

Although not described in this table, the applicable simulation fields are classified from the viewpoint of a flow analysis field, a lean gas flow, a continuous flow, a molecular orbital method, molecular dynamics, a particulate analysis, a radiation analysis, ray tracing, an intermediate flow, a network flow, a graph theory, a cluster analysis, a stability analysis, a plasma analysis, a multivariable control, and the like.

A string model, a cell model, a network model, and the like are available as an applicable profile change model.

As has been described above, according to the present invention, the thickness and profile of, e.g., a thin film which is finally produced can be predicted within a short time. For this reason, simulation for film growth in a semiconductor manufacturing apparatus can be efficiently performed. The present invention can contribute to the optimum setting for a manufacturing method and apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A simulation method for performing a simulation for a trace object that an event occurs depending on a probability in a domain to be analyzed, comprising:

a first step of arranging the trace object in a domain to be analyzed;

the second step of performing the simulation such that the trace object is moved and the number of times of the event occurring as the movement of the trace object or a change amount is made larger than the number of times of the event or a change amount led by a probability; and the third step of outputting a simulation result.

2. A simulation method according to claim 1, wherein the event is reaction of the trace object located in the domain to be analyzed; and the second step includes the step of performing a simulation such that the trace object is moved and the number of times of the reaction occurring as the result of the movement of the trace object or a change amount is made larger than the number of times of the reaction or a change amount led by a probability of known reaction with respect to the trace object.

3. A simulation method according to claim 2, wherein the second step includes sticking to a material located in the domain to be analyzed as reaction of the trace object to be simulated, and includes the step of performing the simulation such that the number of stickings of the trace object is made larger than the number of stickings led by a known sticking probability with respect to the trace object.

4. A simulation method according to claim 3, wherein the second step includes the step of making the number of stickings larger than the number of stickings led by the known sticking probability such that the trace object is considered to be reflected and stuck even if calculation is performed such that the trace object is not stuck on the wall surface but reflected on the basis of the known sticking probability.

5. A simulation method according to claim 3, wherein the second step, when the trace object is of at least two types, includes the step of generating the trace objects in computation depending on the product of a concentration ratio of the trace objects and the sticking probability.

6. A simulation method according to claim 3, wherein the second step, when the trace object is of at least two types, includes the step of causing the trace objects to collide with each other in computation depending on the product of a concentration ratio of the trace objects and the sticking probability.

7. A simulation method according to claim 1, wherein the trace object is particles which move in the domain to be analyzed to be stuck on the wall surface to perform film formation or etching;

the event is sticking of particles located in the domain to be analyzed on the wall surface or a film portion; and the second step includes the step of performing a simulation for predicting a film profile of a film formed such that the particles are moved and the number of stickings occurring as the result of the movement of the particles is made larger than the number of stickings led by a probability of known reaction with respect to the trace object.

8. A simulation method according to claim 7, wherein the second step includes the step of making the number of stickings larger than the number of stickings occurring according to a known sticking probability such that a phenomenon that the particles are reflected by the wall surface or the film portion is treated as a phenomenon that reflection and sticking simultaneously occur in computation.

9. A simulation method according to claim 7, where in the second step includes the step of generating particles contributing to film formation or etching in computation depending on the product of a concentration ratio and a sticking probability when there are two types of particles in the simulation.

10. A simulation method according to claim 7, wherein the second step, when the particles are of at least two types, includes the step of causing the particles to collide with each other in computation depending on the product of a concentration ratio and a sticking probability.

11. A simulation method according to claim 1, wherein the simulation is performed by using a direct simulation Monte Carlo method.

12. A simulation method according to claim 7, wherein at least one of a string model, a cell model, and a network model, is used as a method of tracing a change in film profile.

13. A computer program product for causing a computer system to perform a simulation for a trace object that an event occurs depending on a probability in a domain to be analyzed, comprising:

a storage media;

a first means for giving a command, stored in said storage medium, for arranging the trace object in the domain to be analyzed to said computer system;

a second means for performing a command, stored in said storage media, for performing a simulation such that the trace object is moved and the number of times of the event occurring as the result of the movement of the trace object or a change amount is made larger than a number of times of the event or a change amount led by the probability, to said computer system; and the third means for giving a command, stored in said storage media, for outputting a simulation result, to said computer system.

14. A computer program product according to claim 13, wherein the event is reaction of the trace object located in the domain to be analyzed; and said second means includes means for giving a command for performing a simulation such that the trace object is moved and the number of times of the reaction occurring as the result of the movement of the trace object or a change amount is made larger than the number of times of the reaction or a change amount led by a probability of known reaction with respect to the trace object, to said computer system.

15. A computer program product according to claim 14, wherein said second means includes sticking to a material located in the domain to be analyzed as reaction of the trace object to be simulated, and includes means for giving a command for performing the simulation such that the number of stickings of the trace object is made larger than the number of stickings led by a known sticking probability with respect to the trace object, to said computer system.

16. A computer program product according to claim 15, wherein said second means includes means for giving a command for making the number of stickings larger than the number of stickings led by the known sticking probability such that the trace object is considered to be reflected and stuck even if calculation is performed such that the trace object is not stuck on the wall surface but reflected on the basis of the known sticking probability to said computer system.

17. A computer program product according to claim 15, wherein said second means, when the trace object is of at least two types, includes means for giving a command for generating the trace objects in computation depending on the product of a concentration ratio of the trace objects and the sticking probability, to said computer system.

18. A computer program product according to claim 15, wherein said second means, when the trace object is of at least two types, includes means for giving a command for causing the trace objects to collide with each other in computation depending on the product of a concentration ratio of the trace objects and the sticking probability, to said computer system.

19. A computer program product according to claim 13, wherein the trace object is particles which move in the domain to be analyzed to be stuck on the wall surface to perform film formation or etching;

the event is sticking of particles located in the domain to be analyzed on the wall surface or a film portion; and said second means includes means for giving a command for performing a simulation for predicting a film profile of a film formed such that the particles are moved and the number of stickings occurring as the result of the movement of the particles is made larger than the number of stickings led by a probability of known reaction with respect to the trace object, to said computer system.

20. A computer program product according to claim 19, wherein said second means includes means for giving a command for making the number of stickings larger than the number of stickings occurring according to a known sticking probability such that a phenomenon that the particles are reflected by the wall surface or the film portion is treated as a phenomenon that reflection and sticking simultaneously occur in computation, to said computer system.

21. A computer program product according to claim 19, wherein said second means includes means for giving a command for generating particles contributing to film formation or etching in computation depending on the product of a concentration ratio and a sticking probability when there are two types of particles in the simulation, to said computer system.

22. A computer program product according to claim 19, wherein said second means, when the particles are of at least two types, includes means for giving a command for causing the particles to collide with each other in computation depending on the product of a concentration ratio and a sticking probability, to said computer system.

23. A computer program product according to claim 13, wherein said second means includes means for giving a command for performing the simulation by using a direct simulation Monte Carlo method, to said computer system.

24. A computer program product according to claim 19, wherein said second means includes means for giving a command using at least one of a string model, a cell model, and a network model as a method of tracing a change in film profile, to said computer system.

* * * * *